United States Patent
Huang et al.

(10) Patent No.: US 8,699,165 B2
(45) Date of Patent: Apr. 15, 2014

(54) THERMAL READ/WRITE OFFSET COMPENSATION

(75) Inventors: Lidu Huang, Danville, CA (US);
Fu-Ying Huang, San Jose, CA (US);
Tetsuo Semba, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 11 days.

(21) Appl. No.: 12/827,752

(22) Filed: Jun. 30, 2010

(65) Prior Publication Data

US 2012/0002314 A1    Jan. 5, 2012

(51) Int. Cl.
G11B 5/596 (2006.01)

(52) U.S. Cl.
CPC ................................. G11B 5/59627 (2013.01)
USPC ........................................ 360/55; 360/77.04

(58) Field of Classification Search
None
See application file for complete search history.

(56) References Cited

U.S. PATENT DOCUMENTS

| | | | |
|---|---|---|---|
| 6,078,454 A * | 6/2000 | Takahashi et al. | 360/66 |
| 6,078,455 A * | 6/2000 | Enarson et al. | 360/69 |
| 6,671,790 B2 | 12/2003 | Gay Sam et al. | |
| 7,027,248 B2 * | 4/2006 | Hamaguchi et al. | 360/59 |
| 7,394,612 B2 | 7/2008 | Ahn et al. | |
| 7,400,473 B1 * | 7/2008 | Krajnovich et al. | 360/294.7 |
| 7,518,818 B2 * | 4/2009 | Yamazaki et al. | 360/75 |
| 7,545,595 B2 * | 6/2009 | Hamaguchi et al. | 360/75 |
| 7,599,145 B2 * | 10/2009 | Ishiguro | 360/75 |
| 7,911,724 B2 * | 3/2011 | Buch et al. | 360/51 |
| 2011/0080671 A1 * | 4/2011 | Atsumi et al. | 360/75 |

FOREIGN PATENT DOCUMENTS

JP    2005141874 A   *   6/2005
JP    2005141874 A   *   6/2005

OTHER PUBLICATIONS

Kozierok, Charles M., "Temperature Monitoring by Storage Review", (1997),1-1.

* cited by examiner

Primary Examiner — Wayne Young
Assistant Examiner — James L Habermehl

(57) ABSTRACT

A HDD comprising a temperature sensor disposed inside the HDD configured to periodically measure temperature inside of said hard disk drive; a magnetic disk; a read head; a write head; memory for storing RWO data. The RWO data is a function of a distance between the read head and the write head. The HDD also includes a RWO data adjustor configured to adjust the RWO data in response to a change in temperature of the HDD to compensate for a change in the distance between the read head and the write head based on the change in temperature.

15 Claims, 3 Drawing Sheets

300

```
┌─────────────────────────────────────────────────────────┐
│ determine read/write offset data as a function of a     │
│ distance between a read head and a write head           │
│ 310                                                      │
└─────────────────────────────────────────────────────────┘
                            │
                            ▼
┌─────────────────────────────────────────────────────────┐
│ measure an ambient temperature of a hard disk drive     │
│ 320                                                      │
└─────────────────────────────────────────────────────────┘
                            │
                            ▼
┌─────────────────────────────────────────────────────────┐
│ measure a temperature change of said hard disk drive    │
│ 325                                                      │
└─────────────────────────────────────────────────────────┘
                            │
                            ▼
┌─────────────────────────────────────────────────────────┐
│ in response to the change in temperature of the hard    │
│ disk drive, adjust the read/write offset data to        │
│ compensate for a change in the distance between the     │
│ read head and the write head based on the change in     │
│ temperature                                              │
│ 330                                                      │
└─────────────────────────────────────────────────────────┘
                            │
                            ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ┐
│ in response to the change in temperature of the hard    │
│ disk drive, adjusting the read/write offset data to     │
│ compensate for a change in track pitch based on the     │
│ change in temperature                                    │
│ 340                                                      │
└─ ─ ─ ─ ─ ─ ─ ─ ─ ─ ─ ─ ─ ─ ─ ─ ─ ─ ─ ─ ─ ─ ─ ─ ─ ─ ─ ─ ┘
                            │
                            ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ┐
│ adjust a location of a read/write head based on the     │
│ adjusted read/write offset data based on the            │
│ temperature change                                       │
│ 350                                                      │
└─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 3

THERMAL READ/WRITE OFFSET COMPENSATION

BACKGROUND

Read elements and write elements are located separately in a magnetic heads (e.g., magnetoresistive (MR) heads). Therefore, write head position during data writing requires a different offset than read head position during data reading, which is referred to as read/write offset (RWO) or micro-jog. In particular, RWO changes at different cylinder locations because the actuator motion is rotary and the skew angle of the head against the track direction is different at different tracks. For example, RWO is different at the inner diameter (ID) than the outside diameter (OD) of the magnetic disk. Moreover, temperature changes within a hard disk drive (HDD) can change RWO requirements due to, but not limited to, thermal expansion/contraction of track pitch and the magnetic head

BRIEF DESCRIPTION OF THE DRAWINGS

FIG. 3 illustrates an example of a flow chart of a method for thermal read/write offset compensation, in accordance with an embodiment of the present invention.

The drawings referred to in this description should understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
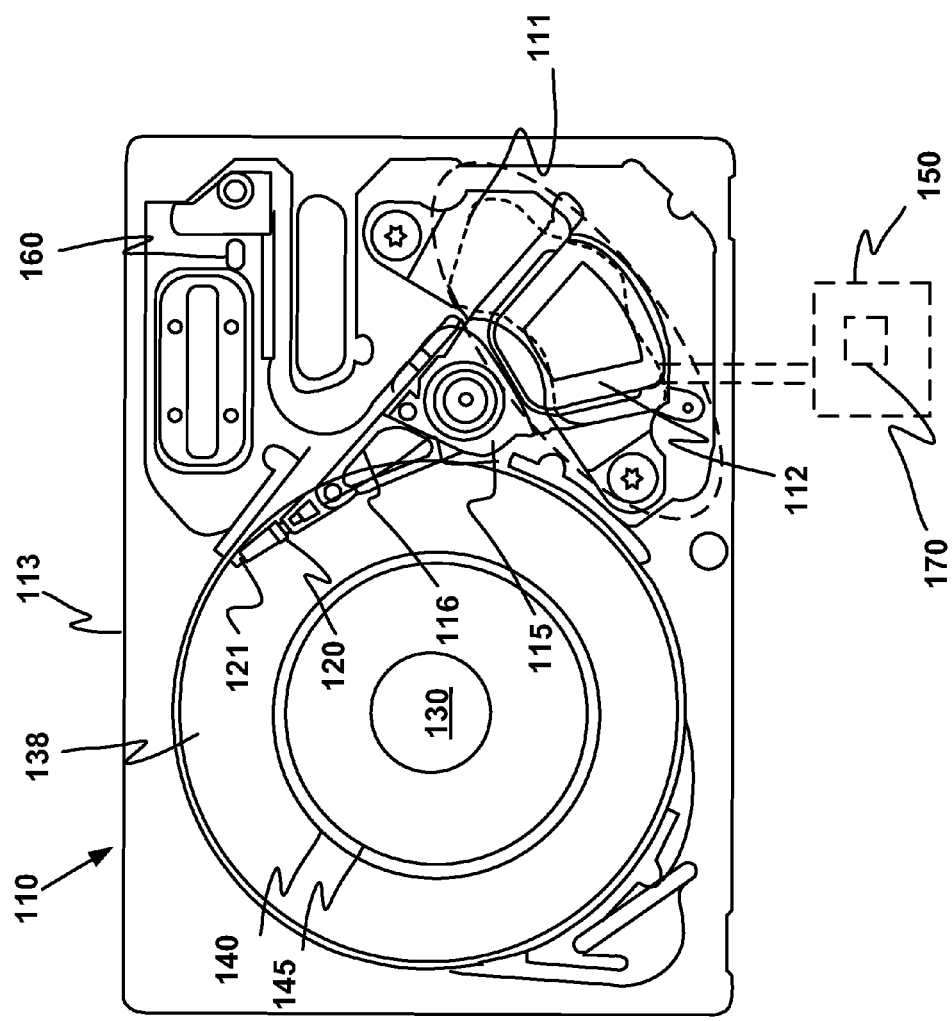
FIG. 1 illustrates an example of a HDD, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer sealed housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 115 includes one or more actuator arms 116. When a number of actuator arms 116 are present, they are usually represented in the form of a comb that is movably or pivotally mounted to base/housing 113. A controller 150 is mounted on a printed circuit board attached to base 113 for moving the actuator arms 116 relative to the disk 138. Controller 150 moves all arms at the same time, but it selectively adjusts the location of each head. Actuator assembly 115 may be coupled with a connector assembly, such as a flex cable to convey data between arm electronics and a host system, such as a computer, wherein HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly 111 is also mounted to actuator arms 116 opposite the head gimbal assemblies. Movement of the actuator assembly 115 by controller 150 causes the head gimbal assembly to move along radial arcs across tracks (e.g., tracks 140 and 145) on the surface of disk 138. In particular, tracks (e.g., tracks 140 and 145) include servo information that is used to center the read/write head. RWO data adjustor in the controller 150 is configured to adjust RWO data in response to a change in temperature of HDD 110, which will be described in detail later.

HDD 110 also includes temperature sensor 160 configured to measure temperature within HDD 110. Temperature sensor 160 can be electrically coupled to detect temperature in read/write head of slider 121. Temperature sensor 160 measures ambient temperature in housing 113.

Figure 2:
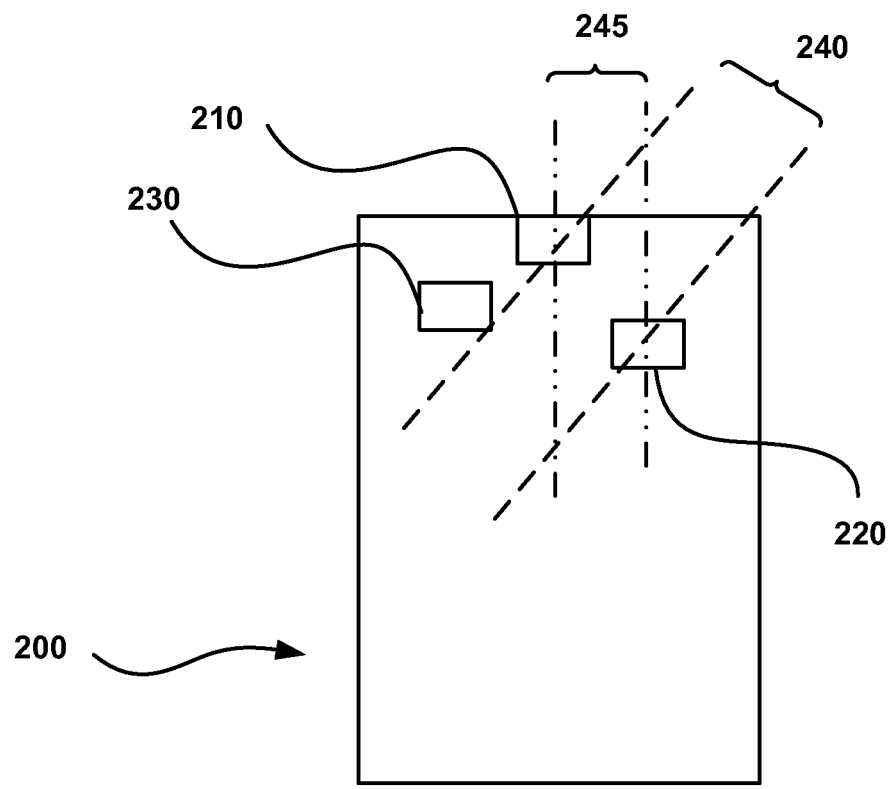
FIG. 2 illustrates an example of a read/write head, in accordance with an embodiment of the present invention.

FIG. 2 depicts a top-down view of head 200, in accordance to various embodiments. In one embodiment, head 200 is a MR head. Head 200 includes a read head 210 and a write head 220. Read head 210 is offset from the write head 220. As a result of the gap between read head 210 and write head 220, centering read head 210 will not necessarily center write head 220 with respect to a track, and vice versa.

RWO is used to properly adjust head 200 during reading/writing operations. RWO is a function of the physical distance between read head 210 and write head 220 and a skew angle. In other words, RWO varies for different radial positions of head 200 with respect to disk 138. For example, RWO 240 at one radial orientation of head 200 is different than RWO 245 at another radial orientation of head 200.

RWO includes offset values for various radial disk positions. RWO data is then used to adjust the position of head 200 to center read head 210 and/or write head 220. For example, if read head 210 is at Track X (determined by servo information), then the location of write head 220 can be interpolated via RWO (e.g., RWO data at Track X). In one embodiment, RWO data is in the form of a skew table. In another embodiment, RWO data is pre-determined and stored in memory (not shown). In one embodiment, memory is HDD firmware. It should be appreciated that if written servo tracks have a variation of track pitch from head-to-head or cylinder-to-cylinder, then a calibration to compensate for the variation is incorporated into RWO data.

As stated above, temperature changes (e.g., change in ambient temperature, temperature change due to write current and/or TFC) within HDD 110 can affect RWO. For example, an increase in ambient temperature of HDD 110 can thermally expand head 200 and change the gap between read head 210 and write head 220. As a result, a location of read head 210 and/or write head 220 that is calculated via predetermined RWO data can be incorrect. Moreover, thermal expansion can also skew track pitch. As a result, a location of read head 210 and/or write head 220 that is calculated via RWO data can be incorrect. In one embodiment, track pitch is about 100 nanometers (nm) and a 25 Celsius (C) temperature change causes a track pitch change of about 0.8 nm or an error of 1-2%. It should be appreciated that heat generated by TFC 230 and heat generated by write current can facilitate in thermal expansion which can skew RWO.

In reference to FIG. 1, RWO data adjustor 170 in controller 150 is configured to compensate for temperature changes in HDD 110. RWO data adjustor 170 in controller 150 receives temperature readings from temperature sensor 160 and RWO data. In one embodiment, in response to a change in temperature and a predetermined temperature coefficient, RWO data adjustor 170 in controller 150 compensates for a change in distance between read head 210 and write head 220. In other words, RWO data is updated in real-time (or time intervals) to compensate for the thermal expansion of head 200 (and resulting change in distance between read head 210 and write head 220).

In another embodiment, RWO data adjustor 170 in controller 150 compensates for a change in track pitch based on a change in temperature. As a result, RWO data is adjusted to compensate for thermal expansion/contraction of track pitch. In a further embodiment, updated RWO data is stored in memory. It should be appreciated that RWO data is applied to servo-positioning (e.g., micro-jog) during data writing based on cylinder location and/or head dependency obtained by calibration at manufacturing process.

FIG. 3 illustrates a flow chart of a method 300 for thermal read/write offset compensation, in accordance with an embodiment of the present invention. In one embodiment, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 300 is performed at least by a system described in FIGS. 1 and 2.

At step 310, RWO data is determined as a function of a distance between a read head and a write head. At step 320, an ambient temperature of a hard disk drive is measured. For example, ambient temperature measured by temperature sensor 160. At step 325, temperature change of the hard disk drive is measured. For example, a temperature change based on write current and/or TFC is measured.

At step 330, in response to the change in temperature of the hard disk drive, RWO data is adjusted to compensate for a change in the distance between the read head and the write head based on the change in temperature. Similarly, at step 340, in response to the change in temperature of the hard disk drive, RWO data is adjusted to compensate for a change in track pitch based on the change in temperature.

At step 350, a location of a head (e.g., head 200) is adjusted based on the adjusted RWO data based on the temperature change.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive comprising:
   a temperature sensor disposed inside said hard disk drive configured to periodically measure temperature inside of said hard disk drive;
   a magnetic disk;
   a read head;
   a write head;
   memory for storing read/write offset data, wherein said read/write offset data is predetermined and static and is a function of a distance between said read head and said write head; and
   a read/write offset data adjustor configured to adjust said read/write offset data in response to a change in temperature of said hard disk drive to compensate for a change in said distance between said read head and said write head based on said change in temperature, said read/write offset adjuster coupled with said memory and configured to access pre-determined temperature based adjustments at a plurality of temperatures stored on said memory.

2. The hard disk drive of claim 1, wherein said read/write offset data comprises:
   pre-determined read/write offset data.

3. The hard disk drive of claim 1, wherein said read/write offset data adjustor is further configured to, in response to said change in temperature of said hard disk drive, adjust said read/write offset data to compensate for a change in track pitch based on said change in temperature.

4. The hard disk drive of claim 1 comprising:
   an actuator arm configured to adjust a location of said read head and said write head based on said adjusted read/write offset data.

5. The hard disk drive of claim 1, wherein said change in temperature comprises:
   change in ambient temperature inside said hard disk drive.

6. The hard disk drive of claim 1, wherein said change in temperature comprises:
   change in temperature of a read/write head based on write current.

7. The hard disk drive of claim 1, wherein said change in temperature comprises:
   change in temperature of a read/write head based on a thermal fly-height control element.

8. A method for thermal read/write offset compensation, said method comprising:
   determining read/write offset data as a function of a distance between a read head and a write head;
   measuring ambient temperature of a hard disk drive;
   measuring a temperature change of said hard disk drive; and
   in response to said change in temperature of said hard disk drive, said read/write offset adjuster accessing pre-determined and static temperature based adjustments at a plurality of temperatures stored on a memory in said hard disk drive and adjusting said read/write offset data to compensate for a change in said distance between said read head and said write head based on said change in temperature and based on said pre-determined adjustments stored on said memory.

9. The method of claim 8, wherein said determining read/write offset data comprises:
pre-determining read/write offset data and storing said pre-determined read/write offset in memory.

10. The method of claim 8, wherein said measuring said temperature of said hard disk drive comprises:
periodically measuring said temperature by a temperature sensor disposed within said hard disk drive.

11. The method of claim 8, further comprising:
in response to said change in temperature of said hard disk drive, adjusting said read/write offset data to compensate for a change in track pitch based on said change in temperature.

12. The method of claim 8, wherein said determining read/write offset data further comprises:
determining read/write offset data based on cylinder location.

13. The method of claim 8, further comprising:
adjusting a location of a read/write head based on said adjusted read/write offset data based on said temperature change.

14. The method of claim 8, wherein said measuring said temperature change comprises:
measuring said temperature change due to write current.

15. The method of claim 8, wherein said measuring said temperature change comprises:
measuring said temperature change due to thermal fly-height control.

\* \* \* \* \*